(12) United States Patent
Gerhard et al.

(10) Patent No.: US 8,064,733 B2
(45) Date of Patent: Nov. 22, 2011

(54) VARIABLE RESOLUTION IMAGES

(75) Inventors: Lutz Gerhard, Seattle, WA (US); Paul D. Jones, Renton, WA (US); David M. Gedye, Seattle, WA (US); Abraham Dunn, Kirkland, WA (US); Radoslav P. Nickolov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 357 days.

(21) Appl. No.: 12/144,638

(22) Filed: Jun. 24, 2008

(65) Prior Publication Data

US 2009/0317020 A1 Dec. 24, 2009

(51) Int. Cl.
*G06K 9/32* (2006.01)

(52) U.S. Cl. .................... 382/299; 382/305; 707/736

(58) Field of Classification Search .................... 382/299
See application file for complete search history.

(56) References Cited

U.S. PATENT DOCUMENTS

| | | | | |
|---|---|---|---|---|
| 4,797,942 A * | 1/1989 | Burt | ............................... | 382/284 |
| 5,278,915 A * | 1/1994 | Chupeau et al. | ............... | 382/236 |
| 5,742,710 A * | 4/1998 | Hsu et al. | ...................... | 382/236 |
| 5,983,263 A | 11/1999 | Rothrock et al. | | |
| 6,014,671 A | 1/2000 | Castelli et al. | | |
| 6,075,535 A | 6/2000 | Fitzhugh et al. | | |
| 6,192,393 B1 | 2/2001 | Tarantino et al. | | |
| 6,272,235 B1 * | 8/2001 | Bacus et al. | ................. | 382/133 |
| 6,396,503 B1 | 5/2002 | Goss et al. | | |
| 6,396,941 B1 | 5/2002 | Bacus et al. | | |
| 6,647,125 B2 * | 11/2003 | Matsumoto et al. | .......... | 382/100 |
| 6,668,101 B2 * | 12/2003 | Kaneda | ......................... | 382/301 |
| 6,684,087 B1 * | 1/2004 | Yu et al. | ....................... | 455/566 |
| 6,747,649 B1 | 6/2004 | Sanz-Pastor et al. | | |
| 6,882,449 B2 * | 4/2005 | Kimmel et al. | ................. | 358/1.9 |
| 6,950,198 B1 | 9/2005 | Berarducci et al. | | |
| 6,978,049 B2 | 12/2005 | Chui et al. | | |
| 7,075,553 B2 | 7/2006 | Miller et al. | | |
| 7,107,285 B2 | 9/2006 | von Kaenel et al. | | |
| 7,149,370 B2 * | 12/2006 | Willner et al. | ................. | 382/305 |
| 7,158,878 B2 | 1/2007 | Rasmussen et al. | | |
| 7,190,839 B1 | 3/2007 | Feather et al. | | |
| 7,206,451 B2 | 4/2007 | Chui et al. | | |
| 7,933,473 B2 | 4/2011 | Gerhard | | |
| 2001/0056418 A1 * | 12/2001 | Youn | ............................... | 707/3 |
| 2002/0018072 A1 | 2/2002 | Chui | | |
| 2002/0021758 A1 | 2/2002 | Chui | | |
| 2002/0054303 A1 | 5/2002 | Matsuyama | | |
| 2003/0067627 A1 | 4/2003 | Ishikawa et al. | | |
| 2004/0167806 A1 | 8/2004 | Eichhorn et al. | | |
| 2004/0215659 A1 * | 10/2004 | Singfield et al. | ........... | 707/104.1 |

(Continued)

OTHER PUBLICATIONS

Google Earth, From Wikipedia, the free encyclopedia, <URL: http://web.archive.org/web/20060513043636/ http://en.wikipedia.org/wiki/Google_Earth>, archived by archive.org. on (May 13, 2006).*

(Continued)

*Primary Examiner* — Sath V Perungavoor

(57) ABSTRACT

In accordance with one or more aspects, a variable resolution image is displayed at an initial resolution. The variable resolution image has multiple portions, at least two of which have different resolutions. A request to display one of the multiple portions of the variable resolution image at a higher resolution is received, and a check is made as to whether a higher resolution version of the one portion is available. The higher resolution version of the one portion is displayed if available, otherwise the one portion at the initial resolution is displayed.

20 Claims, 11 Drawing Sheets

U.S. PATENT DOCUMENTS

| | | |
|---|---|---|
| 2005/0129322 A1 | 6/2005 | Olin et al. |
| 2005/0265611 A1* | 12/2005 | Valadez ................. 382/236 |
| 2006/0159367 A1 | 7/2006 | Zeineh et al. |
| 2006/0170693 A1 | 8/2006 | Bethune et al. |
| 2007/0036462 A1 | 2/2007 | Crandall et al. |
| 2007/0252834 A1 | 11/2007 | Fay |
| 2009/0317010 A1 | 12/2009 | Gerhard |

OTHER PUBLICATIONS

"Image Tiling", retrieved at << http://idlastro.gsfc.nasa.gov/idl_html_help/Image_Tiling.html >>, pp. 3, Retrieved on Apr. 21, 2008.

Hu, et al., "Use Image Streaming Technologies to Present High Resolution Images on the Internet", vol. 35, 2004, Natural Resources Canada, pp. 6.

Martineza, et al., "High Resolution Colorimetric Image Browsing on the Web", Proceedings of the Seventh International Conference on World Wide Web, Computer Networks and ISDN Systems, vol. 30, Issue 1-7, 1998, pp. 9.

"AvisMap GIS Products Overview", AvisMap GIS Technologies, 2003-2007, pp. 5.

Barclay, et al., "Microsoft TerraServer: A Spatial Data Warehouse", Microsoft Technical Report, Jun. 1999, pp. 1-17.

Barclay, et al., "Microsoft TerraServer", Jun. 1998, Microsoft Corporation, pp. 18.

Adelson, et al., "Pyramid Methods in Image Processing", vol. 29, No. 6, RCA Corporation, 1984, pp. 33-41.

Burt, et al., "The Laplacian Pyramid as a Compact Image Code", IEEE Transactions on Communications, vol. 31, No. 4, Apr. 1983, IEEE, pp. 532-540.

"Non-Final Office Action", U.S. Appl. No. 12/144,641, (Nov. 18, 2010), 11 pages.

"FlashPix Format Specification Version 1.0", *Eastman Kodak Company*, (Sep. 11, 1996), 140 pages.

"Notice of Allowance", U.S. Appl. No. 12/144,641 (Jan. 28, 2011), 6 pages.

* cited by examiner

VARIABLE RESOLUTION IMAGES

BACKGROUND

As technology has advanced, digital images with increasingly higher resolutions have become increasingly commonplace. While this higher resolution has advantages, it can also lead to various problems. One such problem is that higher resolution images are typically stored in very large image files. Given the size of these files, it can take significant amounts of time to download the files over networks (such as the Internet) as well as to manage and display the files. Such time requirements can lead to problematic and frustrating user experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the variable resolution images, a variable resolution image is displayed at an initial resolution, the variable resolution image having multiple portions, at least two portions of the multiple portions having different resolutions. A request to display one of the multiple portions of the variable resolution image at a higher resolution is received, and a check is made as to whether a higher resolution version of the one portion is available. The higher resolution version of the one portion is displayed if available, otherwise the one portion at the initial resolution is displayed.

In accordance with one or more aspects of the variable resolution images, at least a portion of a variable resolution image is obtained from a source. The variable resolution image includes multiple image pyramids each having multiple levels, with a first image pyramid of the multiple image pyramids corresponding to a first portion of a level of a second image pyramid of the multiple image pyramids. A level of one of the multiple image pyramids of the variable resolution image is displayed.

BRIEF DESCRIPTION OF THE DRAWINGS

The same numbers are used throughout the drawings to reference like features.

DETAILED DESCRIPTION

Variable resolution images are discussed herein. A variable resolution image includes multiple image pyramids, each image pyramid having multiple levels and each of these levels having a different resolution version of the image. One or more levels in the image pyramid includes multiple portions, one or more of which can correspond to another image pyramid. Some portions of a level can correspond to one or more other image pyramids, whereas other portions of the level do not. Accordingly, different portions in a level of an image pyramid can have different resolutions.

Figure 1:
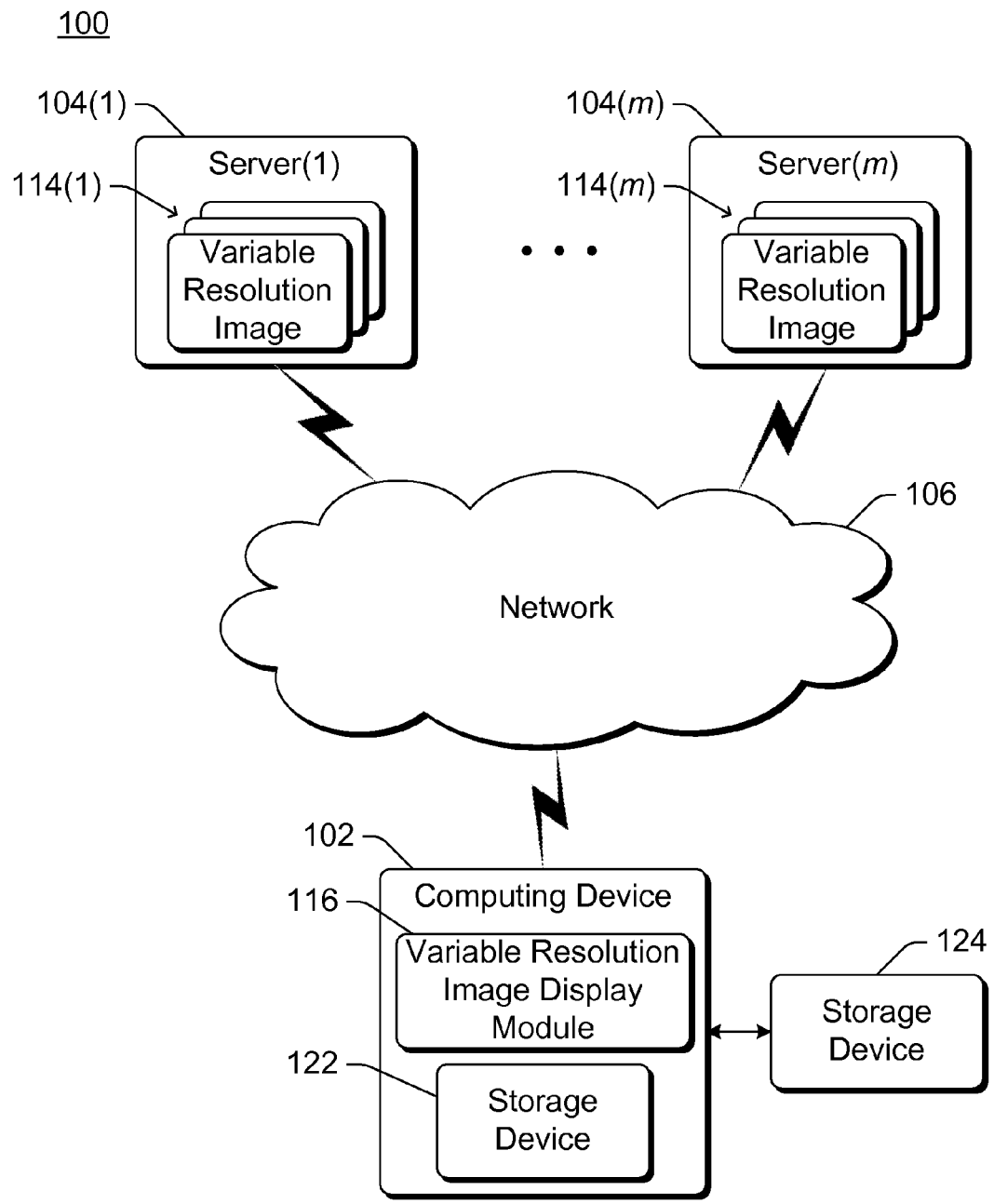
FIG. 1 illustrates an example system implementing variable resolution images in accordance with one or more embodiments.

FIG. 1 illustrates an example system 100 implementing variable resolution images in accordance with one or more embodiments. System 100 includes a computing device 102 that can communicate with one or more (m) servers 104 via a network 106. Network 106 can be a variety of different networks, including the Internet, a local area network (LAN), an intranet, a public telephone network, cellular or other wireless phone networks, other public and/or proprietary networks, combinations thereof, and so forth.

Computing device 102 can be a variety of different devices capable of generating and/or displaying images. For example, computing device 102 can be a desktop computer, a server computer, a mobile station, an entertainment appliance, a set-top box communicatively coupled to a display device, a cellular or other wireless phone, a game console, an automotive computer, a digital camera, a video camera, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Servers 104 can be a variety of different computing devices capable of storing variable resolution images 114(1), . . . , 114(m) that can be retrieved and displayed by a variable resolution image display module 116 of computing device 102. Similar to the discussion of computing device 102, servers 104 can be a variety of different devices, ranging from full resource devices with substantial memory and processor resources to a low-resource device with limited memory and/or processing resources.

Variable resolution image display module 116 obtains variable resolution images and displays those images, and/or generates variable resolution images and stores those images. Variable resolution image display module 116 can be implemented using software, firmware, hardware, or combinations thereof. Variable resolution image display module 116 can be a standalone module, such as a software module executing as a separate program on device 102. Alternatively, variable resolution image display module 116 can be included as part of another component or module, such as part of a Web browser, part of an operating system, and so forth.

Module 116 can obtain variable resolution images from, and store variable resolution images to, a variety of different sources, such as servers 104, local storage device 122, local storage device 124, and so forth. Local storage device 122 is a storage device included as part of computing device 102, such as a magnetic disk, an optical disc, flash memory, and so forth. Local storage device 124 is a storage device coupled to, but typically not included as part of, computing device 102. For example, local storage device 124 can be a removable memory device (e.g., a magnetic disk, an optical disc, flash memory, and so forth), can be an external device coupled via a wired or wireless connection to computing device 102 (e.g., a magnetic disk, an optical disc, flash memory, and so forth). Computing device 102 can also obtain variable resolution images from other sources, such as another remote device, other computing devices 102, and so forth.

A variable resolution image refers to an image in which different portions can have different resolutions. Each variable resolution image includes multiple image pyramids, each image pyramid including multiple levels that are different resolution versions of at least a portion of the image. Different portions of an image can correspond to one or more additional image pyramids, as discussed in more detail below.

Figure 2A:
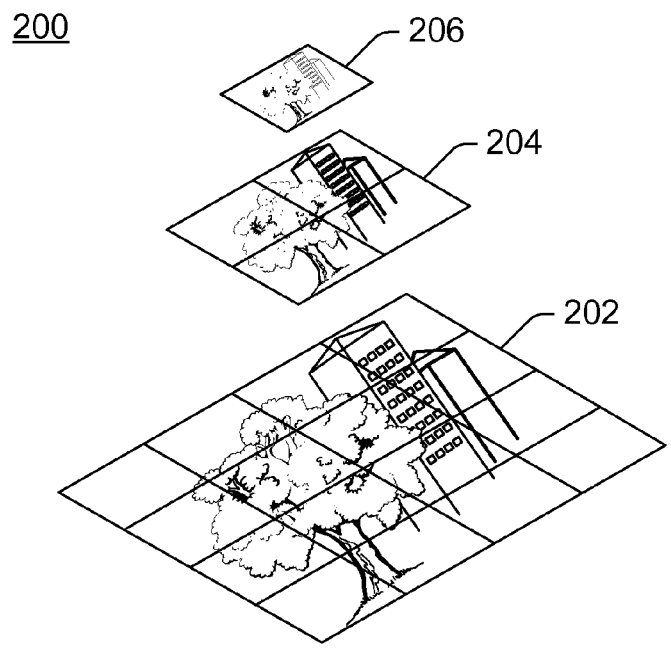
FIGS. 2A and 2B illustrate an example image pyramid in accordance with one or more embodiments.
Figure 2B:
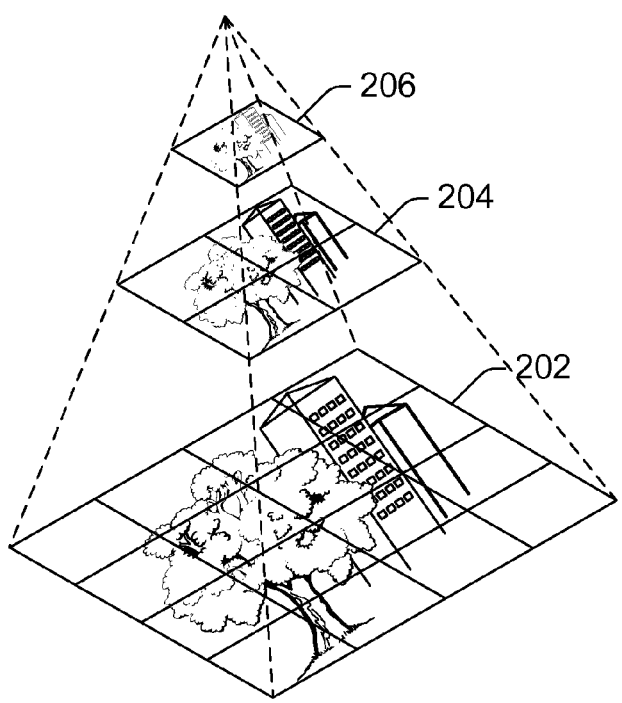

FIGS. 2A and 2B illustrate an example image pyramid in accordance with one or more embodiments. In FIG. 2A, an image pyramid 200 is illustrated including multiple levels 202, 204, and 206. In FIG. 2B, dashed lines have been added to image pyramid 200 to illustrate the pyramid nature of the multiple levels.

Each level 202, 204, and 206 is a different version of the same image, the different versions having different resolutions. In one or more embodiments, the bottom level of image pyramid 200, which is level 202 in FIGS. 2A and 2B, is a highest resolution version of the image in pyramid 200.

Image pyramid 200 can be generated in a variety of different manners. In one or more embodiments, image pyramid 200 is generated based on level 202. The number of pixels in each dimension of level 202 is reduced by a particular factor (e.g., 2, 3, 4, etc.), and a lower resolution version of the image is generated and used as level 204. Both dimensions can be reduced by the same factor, or alternatively different factors (e.g., one dimension could be reduced by a factor of 2 while the other dimension is reduced by a factor of 3). The lower resolution version can be generated using any of a variety of different scaling or image resizing algorithms or processes, such as Mitchell filters, box filters, bicubic filters, seam carving, and so forth. This process continues until the top level of image pyramid 200 is generated, which is level 206 in the example of FIG. 2A. Various techniques for generating an image pyramid 200 are discussed in more detail below.

By way of example, assume that level 202 has a resolution of 1024×1024 pixels. Both of these dimensions can be reduced by a factor of 2, so that level 204 has a resolution of 512×512 pixels. Both of these dimensions at level 204 can be reduced by a factor of 2, so that level 206 has a resolution of 256×256 pixels. Although level 206 is illustrated as the top level in FIG. 2A, it is to be appreciated that this process can continue until a threshold resolution is reached. This threshold resolution can be set at any resolution, such as 256×256 pixels, 1×1 pixel, 8×8 pixels, and so forth.

Additionally, it should be noted that different factors can be used for different levels. For example, assuming level 202 has a resolution of 1024×1024, both of these dimensions can be reduced by a factor of 4 so that level 204 has a resolution of 256×256. Both of these dimensions at level 204 can be reduced by a factor of 2 so that level 206 has a resolution of 128×128 pixels, or some other factor (such as a factor of 4 so that level 206 has a resolution of 64×64 pixels).

Alternatively, image pyramid 200 can be generated based on a different level, such as level 204. Lower resolution versions of the image can be generated using a variety of different scaling or image resizing algorithms or processes as discussed above. Higher resolution versions of the image can also be generated using a variety of different image resizing algorithms or processes, such as bilinear interpolation, nearest-neighbor interpolation, bicubic interpolation, and so forth.

Three levels or layers have been illustrated in FIGS. 2A and 2B for ease of explanation. However, it is to be appreciated that an image pyramid can store two levels, or alternatively three or more levels.

The use of image pyramids allows for images to be displayed more quickly in many situations. When initially displayed, an initial resolution of the image can be displayed. This initial resolution can vary, and can be the version of the image at the top level of the image pyramid or alternatively can be some other resolution. In one or more embodiments, this initial resolution of the image is the resolution in image pyramid 200 that is closest to the resolution of the display device on which the image is being displayed, or the resolution of a window or other portion in which the image is being displayed. For example, if the image is being displayed on a display device that has a resolution of 256×256 pixels, then the initial resolution of the image is 256×256 pixels. By way of another example, if the image is being displayed on a display device that has a resolution of 1024×1024 pixels, but is being displayed in a window that is 480×480 pixels, then the initial resolution of the image is 512×512 pixels (the level in pyramid 200 that is closest to the resolution of the window in which the image is being displayed). Thus, it can be seen that the initial resolution of the image can be less than the highest resolution of the image, so that only a lower resolution (e.g., 256×256 pixels, 512×512 pixels, etc.) version of the image need be obtained rather than the highest resolution (1024×1024 pixels) version of the image. As the lower resolution levels are typically smaller (e.g., smaller files, smaller amounts of data, etc.), these lower resolution levels oftentimes can be obtained from the source faster than higher resolution levels, and can oftentimes utilize less resources on computing device 102 when displaying the levels.

The initial resolution can be identified or determined in a variety of different manners. In one or more embodiments, variable resolution image display module 116 is programmed or otherwise configured with the initial resolution. Alternatively, other techniques can be used such as module 116 accessing a record (e.g., an operating system registry) to identify a current resolution of a display (or a current size of a window in which the image is to be displayed) and set the initial resolution based on this identified current resolution. By way of other examples, other techniques can include including metadata with image pyramid 200 that identifies the initial resolution, having a communication protocol that defines a default initial resolution, and so forth.

Additionally, one or more levels of image pyramid 200 can be separated into different tiles. As illustrated in FIGS. 2A and 2B, level 204 is separated into four different tiles, while level 202 is separated into sixteen different tiles. In the illustrated example of FIGS. 2A and 2B, the different levels are separated into equal-size tiles, although alternatively the tiles can be different sizes. Additionally, in the illustrated example of FIGS. 2A and 2B, the different tiles are rectangles, although alternatively the tiles can be other shapes (e.g., triangles, hexagons, circles, and so forth).

The number of tiles that a particular level is separated into can vary. In one or more embodiments, the number of tiles is based on a size of each tile. For example, each tile may be 256×256 pixels, so the number of tiles for a level will vary based on the resolution of that level. Alternatively, the number of tiles can be static and the size of each tile can vary. By way of example, each level may be separated into sixteen tiles, so the number of pixels in each tile will vary based on the resolution of that level.

Separating the levels into different tiles allows different parts of a level of an image to be obtained and displayed at a particular time. Only those parts that are actually to be displayed can be obtained, alleviating the device from the burden of obtaining parts that are not to be displayed. For example, assume that a user of the device zooms in to the top right quadrant of the version of the image at level 204 being displayed. The top right quadrant of the image at level 202 (e.g., the four tiles in the top right corner of level 202) can be obtained and displayed, but the other tiles are not obtained because they are not displayed. If the user were to subsequently request zooming in on one of those other tiles, then those other tiles can be obtained at that time.

Figure 3:
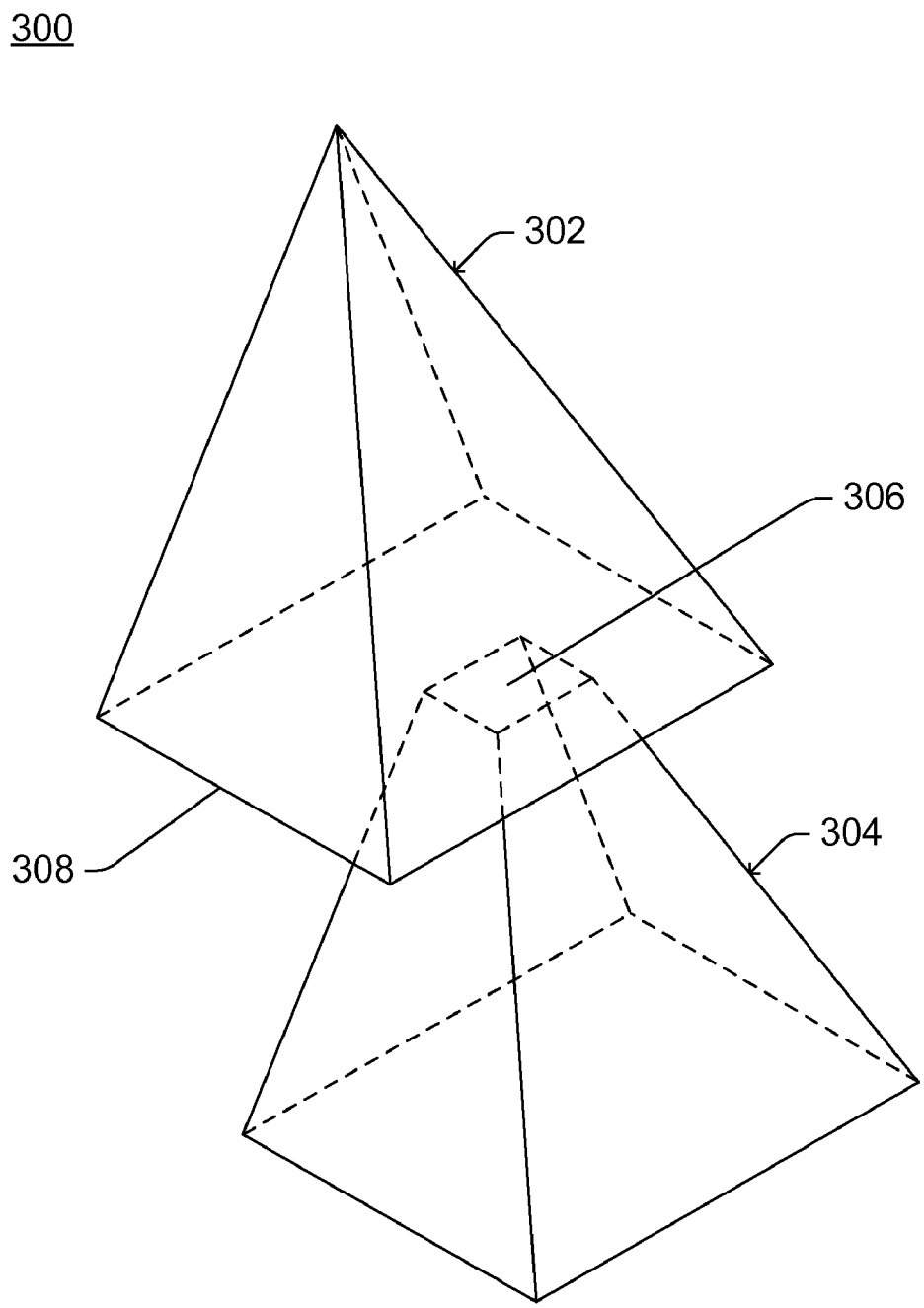
FIG. 3 illustrates an example variable resolution image in accordance with one or more embodiments.

FIG. 3 illustrates an example variable resolution image 300 in accordance with one or more embodiments. A variable resolution image as discussed herein includes multiple image pyramids. One of the image pyramids, which can also be referred to as a top pyramid, has a bottom level that includes multiple portions. One or more of these portions corresponds to another image pyramid. These portions can be the tiles of the bottom level, or alternatively different parts of the bottom level having different sizes and/or shapes than the tiles. Analogous to the tiles, each portion of the bottom level can be a variety of different shapes (e.g., rectangles, triangles, hexagons, circles, and so forth).

Variable resolution image 300 includes an image pyramid 302 and an image pyramid 304. Image pyramid 302 is a top pyramid, and the initial resolution of image 300 is one of the levels in image pyramid 302. Image pyramid 304 corresponds to or is associated with a portion 306 of the bottom level 308 of image pyramid 302. Portion 306 can be, but need not be, a tile as discussed above. Accordingly, if a user of the device displaying variable resolution image 300 zooms in on portion 306, the zooming can display levels of image pyramid 304. However, if the user were to zoom in on other portions of bottom level 308 that did not correspond to other image pyramids, then no higher resolution images of such portions are obtained and displayed.

In one or more embodiments, the resolution of the top level of image pyramid 304 is the same as the portion 306. For example, if the portion 306 were 256×256 pixels, then the resolution of the top level of image pyramid 304 would be 256×256 pixels. In one or more other embodiments, the resolution of the top level of image pyramid 304 is a higher resolution than portion 306. For example, if the portion 306 were 256×256 pixels, then the resolution of the top level of image pyramid 304 could be 512×512 pixels. In such embodiments, image pyramid 304 corresponds to portion 306, but does not include the same resolution version of portion 306 as image pyramid 302 includes (since it is already included in image pyramid 302, there is no need to duplicate it in image pyramid 304).

Similarly, from a perspective of generating variable resolution images, higher resolution versions of portion 306 are stored as image pyramid 304, but higher resolution versions of other portions in bottom level 308 are not generated and stored. Thus, additional storage space need not be consumed for portions of bottom level 308 for which higher resolution versions are not available.

By way of a specific example, assume that image pyramid 302 has a top level having a resolution of 1×1 pixel, a bottom level 308 having a resolution of 1024×1024 pixels, and each of sixteen tiles in bottom level 308 is 256×256 pixels. Further assume that image pyramid 304 has a top level that is 256×256 pixels, and a bottom level that is 2048×2048 pixels. Assuming portion 306 were a 256×256 pixel tile (or other 256×256 pixel portion), if the user were to zoom in on portion 306, image 300 can be displayed with a resolution as if the bottom level of image 300 had a resolution of 8192×8192 pixels, whereas the other portions of bottom level 308 would be displayed with a resolution as if the bottom level of image 300 had a resolution of 1024×1024 pixels. Accordingly, portion 306 is stored in variable resolution image 300 with higher resolution data as if the bottom level of image 300 had a resolution of 8192×8192 pixels, while the remaining portions of bottom level 308 are stored as if the bottom level of image 300 had a resolution of 1024×1024 pixels.

Thus, it can be seen that different portions in a level of an image pyramid can have different resolutions. For example, following the above example, portion 306 of image 300 can have a resolution of 2048×2048 pixels (corresponding to an image resolution of 8192×8192 pixels), while other portions of level 308 have a resolution of 256×256 pixels (corresponding to an image resolution of 1024×1024 pixels).

As can be seen in FIG. 3, a portion of a bottom level of one image pyramid is the top level of another image pyramid. In one or more embodiments, image pyramids are associated with the bottom level of another image pyramid. Alternatively, image pyramids can be associated with other levels of an image pyramid.

In one or more embodiments, variable resolution images have an identifier or other indication of which portions are at which resolutions. In one or more embodiments, metadata associated with a variable resolution image includes an indication of which portions have higher resolutions available (e.g., which portions of which levels have additional corresponding image pyramids). Alternatively, this identifier or other indication can be identified in different manners. For example, the variable resolution image can include identifiers of particular portions that have higher resolutions available (e.g., which portions of which levels have additional corresponding image pyramids). By way of another example, a portion of a level can have an identifier encoded or embedded therein (e.g., such as using digital watermarking) to identify another image pyramid that corresponds to that portion. By way of yet another example, a portion of a level can be stored as a file having a file name identifying another image pyramid that corresponds to that portion.

It should be noted that situations can arise where a portion for which a higher resolution is available is a different shape and/or size than the tiles of the level. In such situations, a user may zoom in on the portion for which a higher resolution is available, but that higher resolution data may not include data for other parts of one or more tiles around that portion being displayed. Such situations can be resolved in different manners. In one or more embodiments, such situations are resolved by using a variety of different scaling or image resizing algorithms or processes as discussed above to obtain higher resolution versions of those parts being displayed for which higher resolution data is not available. Alternatively, a variety of other techniques can be used, such as zooming in to a level so that no parts are displayed for which higher resolution data is not available, only displaying the higher resolution data (e.g., leaving the other parts blank or black), and so forth.

FIG. 3 illustrates an example variable resolution image that includes two image pyramids. However, it is to be appreciated that a variable resolution image can alternatively include three or more image pyramids.

Figure 4:
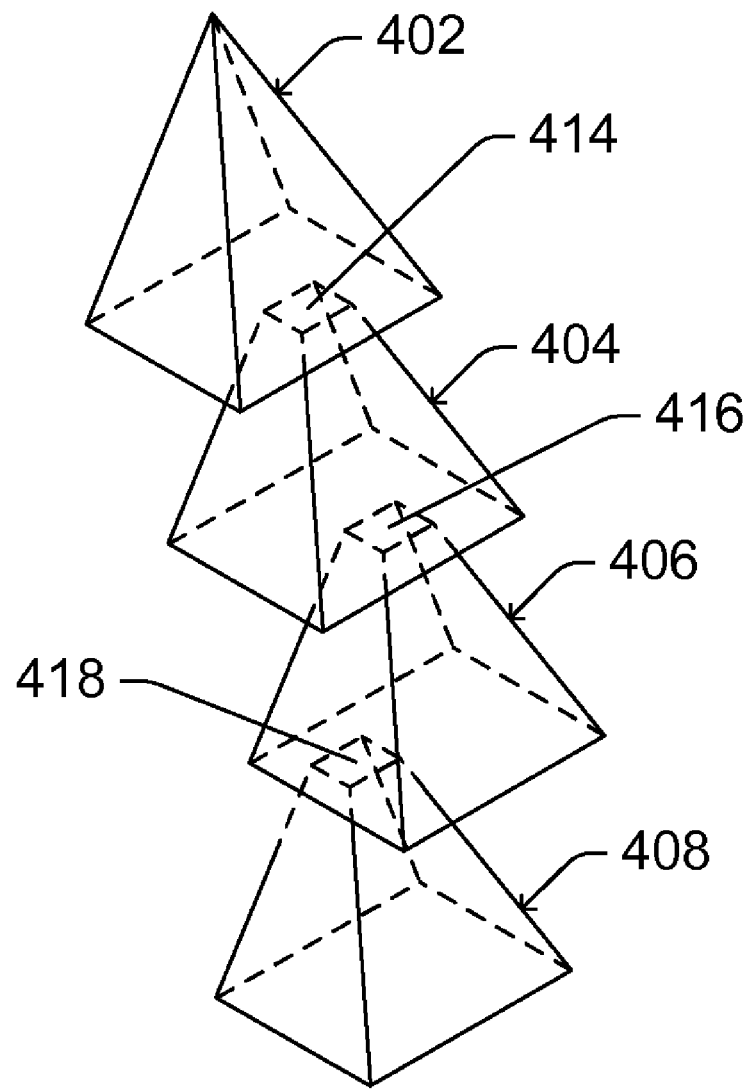
FIG. 4 illustrates another example variable resolution image in accordance with one or more embodiments.

FIG. 4 illustrates another example variable resolution image 400 in accordance with one or more embodiments. Variable resolution image 400 is similar to variable resolution image 300 of FIG. 3, although image 400 includes four image pyramids whereas image 300 includes two image pyramids.

Variable resolution image 400 includes image pyramids 402, 404, 406, and 408. Image pyramid 404 corresponds to a portion 414 of a bottom level of image pyramid 402. Image pyramid 406 corresponds to a portion 416 of a bottom level of image pyramid 404. Image pyramid 408 corresponds to a portion 418 of a bottom level of image pyramid 406. Accordingly, it can be seen that a user can zoom into a higher resolution image for portion 418 (via image pyramids 404, 406, and 408) than for other portions of the bottom level of image pyramid 402.

By way of a specific example, assume that image pyramid 402 has a top level having a resolution of 1×1 pixel, a bottom level having a resolution of 1024×1024 pixels, and each of sixteen tiles in the bottom level of pyramid 402 is 256×256 pixels. Further assume that each of image pyramids 404, 406, and 408 has a top level that is 256×256 pixels, a bottom level that is 1024×1024 pixels, and each of sixteen tiles in the bottom level being 256×256 pixels. If the user were to zoom in on portion 414 (being a tile or other 256×256 pixel portion), then on portion 416 (being a tile or other 256×256 pixel portion), and then on portion 418 (being a tile or other 256×256 pixel portion), portion 418 of image 400 can be displayed with a resolution as if the bottom level of image 400 had a resolution of 65,536×65,536 pixels. Portions of the bottom level of image pyramid 406 other than portion 418 would be displayed as if the bottom level of image 400 had a resolution of 16,384×16,384 pixels. Portions of the bottom level of image pyramid 404 other than portion 416 would be displayed as if the bottom level of image 400 had a resolution of 4096×4096 pixels. Portions of the bottom level of image pyramid 402 other than portion 414 would be displayed as if the bottom level of image 400 had a resolution of 1024×1024 pixels.

It should be noted that although variable resolution image 300 of FIG. 3 and variable resolution image 400 of FIG. 4 illustrate example images in which one portion of the bottom level of an image pyramid corresponds to another image pyramid, alternatively multiple portions of the bottom level of an image pyramid can correspond to other image pyramids. Any portion of a level of an image can correspond to an image pyramid, and accordingly a variable resolution image can include any number of image pyramids.

Additionally, it should be noted that one or more portions of a level of an image period may have no corresponding image pyramid. For example, in FIG. 3 portion 306 has a corresponding image pyramid, but other portions in level 308 may have no corresponding image pyramid.

Figure 5:
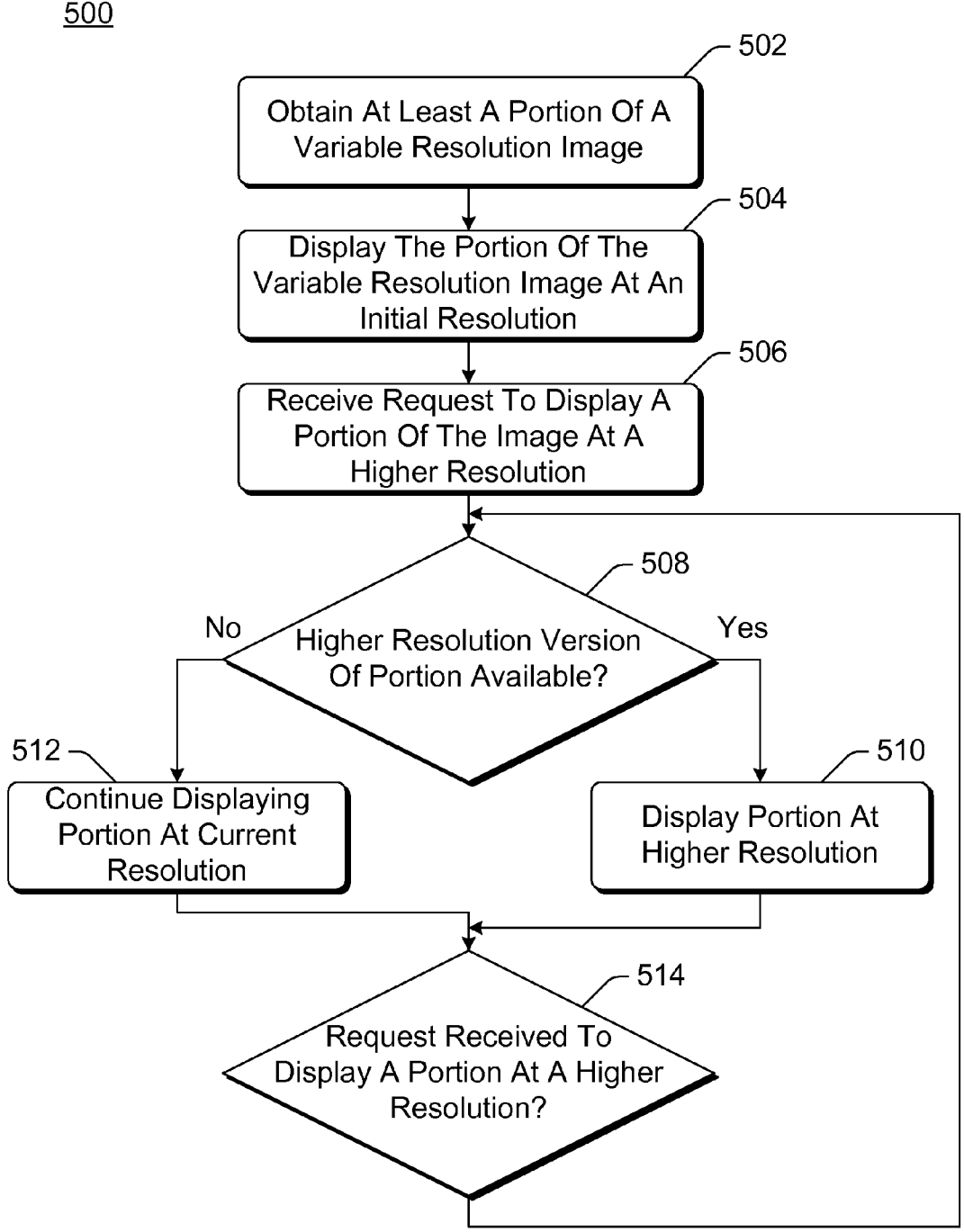
FIG. 5 is a flowchart illustrating an example process for displaying variable resolution images in accordance with one or more embodiments.

FIG. 5 is a flowchart illustrating an example process 500 for displaying variable resolution images in accordance with one or more embodiments. Process 500 is carried out by a device, such as device 102 of FIG. 1, and can be implemented in software, firmware, hardware, or combinations thereof. Process 500 is an example process for using variable resolution images; additional discussions of using variable resolution images are included herein with reference to different figures.

In process 500, at least a portion of a variable resolution image is obtained (act 502). This portion can be obtained from a variety of different local and/or remote sources, as discussed above. Also as discussed above, this portion can be a level of an image pyramid or alternatively one or more tiles of a level of an image pyramid.

The obtained portion of the variable resolution image is displayed at an initial resolution (act 504). This initial resolution can be determined in a variety of different manners, as discussed above.

A request to display a portion of the variable resolution image at a higher resolution is received (act 506). This request can be received from a user or alternatively another component, module, or device.

A check is made as to whether a higher resolution version of the portion is available (act 508). As discussed above, this higher resolution version is obtained from another level in the same image pyramid as the level currently being displayed, or alternatively from another image pyramid corresponding to the portion being displayed.

If a higher resolution version of the portion is available, then the portion is displayed at the higher resolution (act 510). However, if a higher resolution version of the portion is not available, then the display of the portion at the current resolution continues (act 512).

Process 500 then returns to act 508 in response to receiving another request to display a portion of the image at a higher resolution (act 514).

Figure 6:
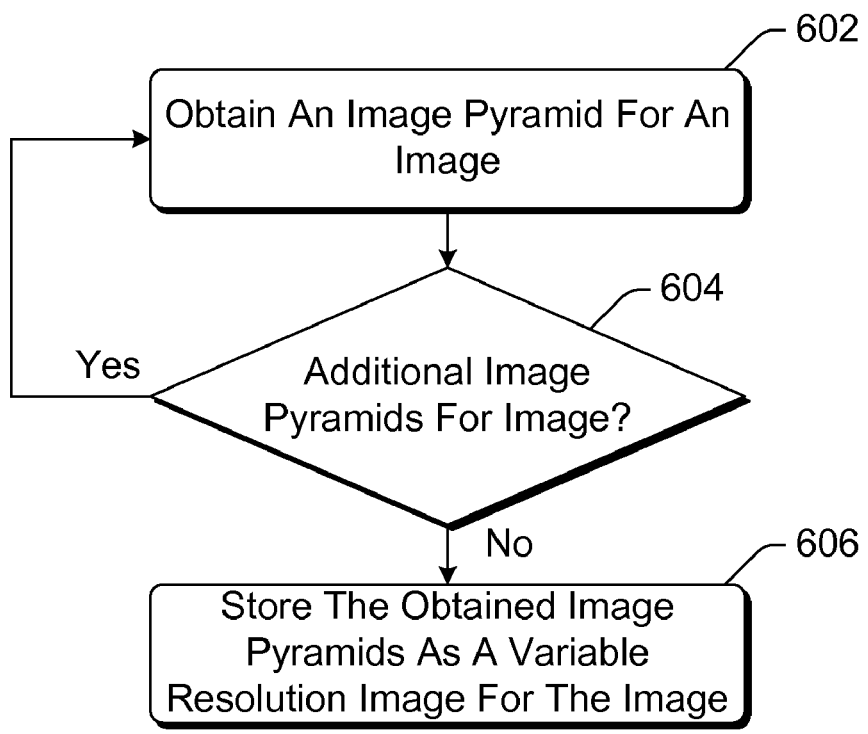
FIG. 6 is a flowchart illustrating an example process for generating variable resolution images in accordance with one or more embodiments.

FIG. 6 is a flowchart illustrating an example process 600 for generating variable resolution images in accordance with one or more embodiments. Process 600 is carried out by a device, such as device 102 or server 104 of FIG. 1, and can be implemented in software, firmware, hardware, or combinations thereof. Process 600 is an example process for using variable resolution images; additional discussions of using variable resolution images are included herein with reference to different figures.

In process 600, an image pyramid for an image is obtained (act 602). The image pyramid can be obtained in a variety of different manners, such as being received from another component or module, being retrieved from a local or remote source (e.g., as identified by a user, as identified by another component or module, as identified in a data file, etc.), and so forth.

A check is made as to whether additional image pyramids exist for the image (act 604). Additional image pyramids for the image can be identified in a variety of different manners, such as being identified by a user of the device implementing process 600, being identified by another component, module, or device, being identified in a data file, and so forth.

If there are additional image pyramids, then process 600 returns to act 602 to obtain one of the image pyramids. However, if there are no more additional image pyramids for the image, then the image pyramids obtained in act 602 are stored as a variable resolution image for that image (act 606).

Returning to FIG. 1, an image pyramid can be generated in a variety of different manners by a variety of different devices. For example, image pyramids can be generated by a server 104, a computing device 102, other devices or components, and so forth. In one or more embodiments, an image pyramid is generated by obtaining an image and using that image as the bottom level of the image pyramid. One or more additional versions having lower resolutions than the bottom level are then generated based on the image. These versions are obtained by scaling down the resolution by a particular factor (e.g., 2, 3, 4, etc.) as discussed above.

Additionally, each of the levels in an image pyramid can be compressed in a variety of different manners. Any of a variety of different compression processes can be used to compress the levels of the image pyramid, including lossy and lossless processes. Examples of such compression processes include JPEG (Joint Photographic Experts Group) compression, TIFF (Tagged Image File Format) compression, HD photo compression, compression using gzip (GNU zip) and so forth. These compression processes can be applied to a level of an image pyramid as a whole, or alternatively can be applied to individual tiles (or other portions) of a level of the image pyramid separately. For example, level 202 of FIG. 2A includes sixteen tiles. Each of these different tiles can be compressed separately using any of these compression processes.

Furthermore, in situations where tiles of a level are compressed separately, the compression processes can take into account data from adjacent tiles. By taking into account data from adjacent tiles, also referred to as tile overlapping, the results of the compression processes along the edges of the tiles can be improved. Such results can be obtained due to the compression processes being able to take into account, when processing data at the edge of the tile, data in an adjacent tile rather than having no data.

Figure 7:
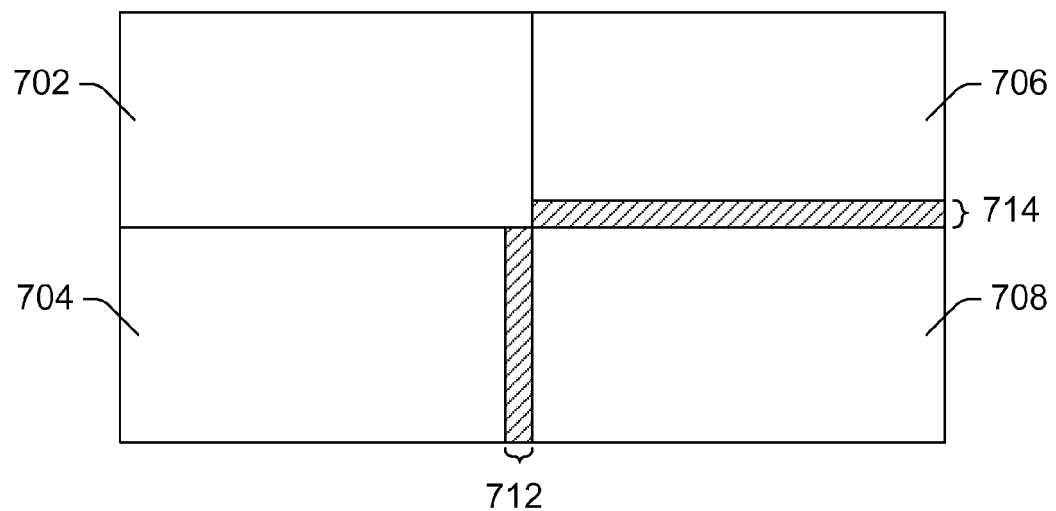
FIG. 7 illustrates an example of the tile overlapping in accordance with one or more embodiments.

FIG. 7 illustrates an example of the tile overlapping in accordance with one or more embodiments. FIG. 7 illustrates four tiles 702, 704, 706, and 708. When compressing tile 708 using tile overlapping, data from tile 704 and/or tile 706 is taken into account. Alternatively, data from tile 702 can also be taken into account. The data from tile 704 that is taken into account is the data along the edge of tile 704 adjacent tile 708. This is illustrated in FIG. 7 as cross-hatched section 712. The amount of data taken into account can vary. In one or more embodiments, the amount of data is 8 or 16 pixels deep along the edge of tile 704, although alternatively more or less data could be used.

Similarly, the data from tile 706 that is taken into account is the data along the edge of tile 706 adjacent tile 708. This is illustrated in FIG. 7 as cross-hatched section 714. Again, the amount of data taken into account can vary.

Returning to FIG. 1, it should be noted that different compression processes can be used for different levels of the image pyramid. In one or more embodiments, lower quality compression processes are used on lower levels of the pyramid (including the bottom level) than are used on higher levels of the image pyramid. For example, looking at FIG. 2A, a lower quality compression process would be used to compress level 202 (or tiles of level 202) than is used to compress level 204 (or tiles of level 204).

A lower quality compression process refers to a compression process that achieves a higher compression ratio than a higher quality compression process. Thus, lower quality compression processes typically generate lower quality versions of the image but also smaller compressed files. Different quality compression processes can be obtained in a variety of different manners. For example, different compression algorithms can be different quality compression processes. By way of another example, the same compression algorithm can be configured to be a higher quality compression process or a lower quality compression process based on the compression settings and/or parameters of the algorithm.

The image data for an image pyramid can be stored in a variety of different manners. The manner in which the image data is stored can facilitate obtaining a part of a level of the image pyramid (e.g., when the user is zooming in on a particular portion, as discussed above). In one or more embodiments, the image data for the image pyramid is stored using a file hierarchy in which each level of the image pyramid has a corresponding folder. Within the folder corresponding to a particular level is one or more files, each file including image data for a tile of that particular level. Additionally, each of the files has a file name identifying which tile of the level the image data included in the file is for. A particular naming convention is used for the images so that the file storing the image data for a particular tile of the level can be readily identified.

Additionally, a first image pyramid corresponding to a particular portion of a level of a second image pyramid can be stored in a separate set of folders, or alternatively as part of the same set of folders as the second image pyramid. For example, the folder corresponding to the level that the particular portion is part of can include additional folders in a file hierarchy in which each level of the first image pyramid has a corresponding folder.

By way of example, referring to FIG. 2A, three levels 202, 204, and 206 are illustrated for image pyramid 200. A separate folder is generated for each of these three levels, and each of these folders can be stored under a parent folder. The folder can be named using a variety of different naming conventions, such as "folder0", "folder1", "folder2", etc., with "folder0" corresponding to the top level (level 202), "folder1" corresponding to the next level (level 204), and so forth. Additionally, level 202 includes sixteen tiles arranged in rows and columns. The image data in each of these tiles is stored (typically after being compressed) in a file in the folder corresponding to level 202. The tiles can be named using a variety of different naming conventions, such as "x_y", where "x" refers to a column of the level and "y" refers to a row of the level. For example, the top-left portion could have a file name of "0_0", while the bottom-right portion could have a file name of "4_4". It is to be appreciated, however, that these examples of naming conventions for files and folders are only examples, and other naming conventions can alternatively be used.

By way of further example, if "folder 2" were to be the bottom level of the image pyramid and a second image pyramid corresponds to a portion of the bottom level, then an additional folder can be included in "folder2". This additional folder would be the folder corresponding to the top level of the second image pyramid.

Additionally, in one or more embodiments a manifest is stored with the image data. The manifest can be stored in different manners, such as in a separate file in one of the folders corresponding to the image pyramid (e.g., in the parent folder), as metadata corresponding to one of the files, and so forth. The manifest is metadata identifying whether additional detail for a portion of a level exists, and if so where that additional detail can be obtained. For example, the manifest can identify which tiles (or other portions) have additional corresponding image pyramids.

Figure 8:
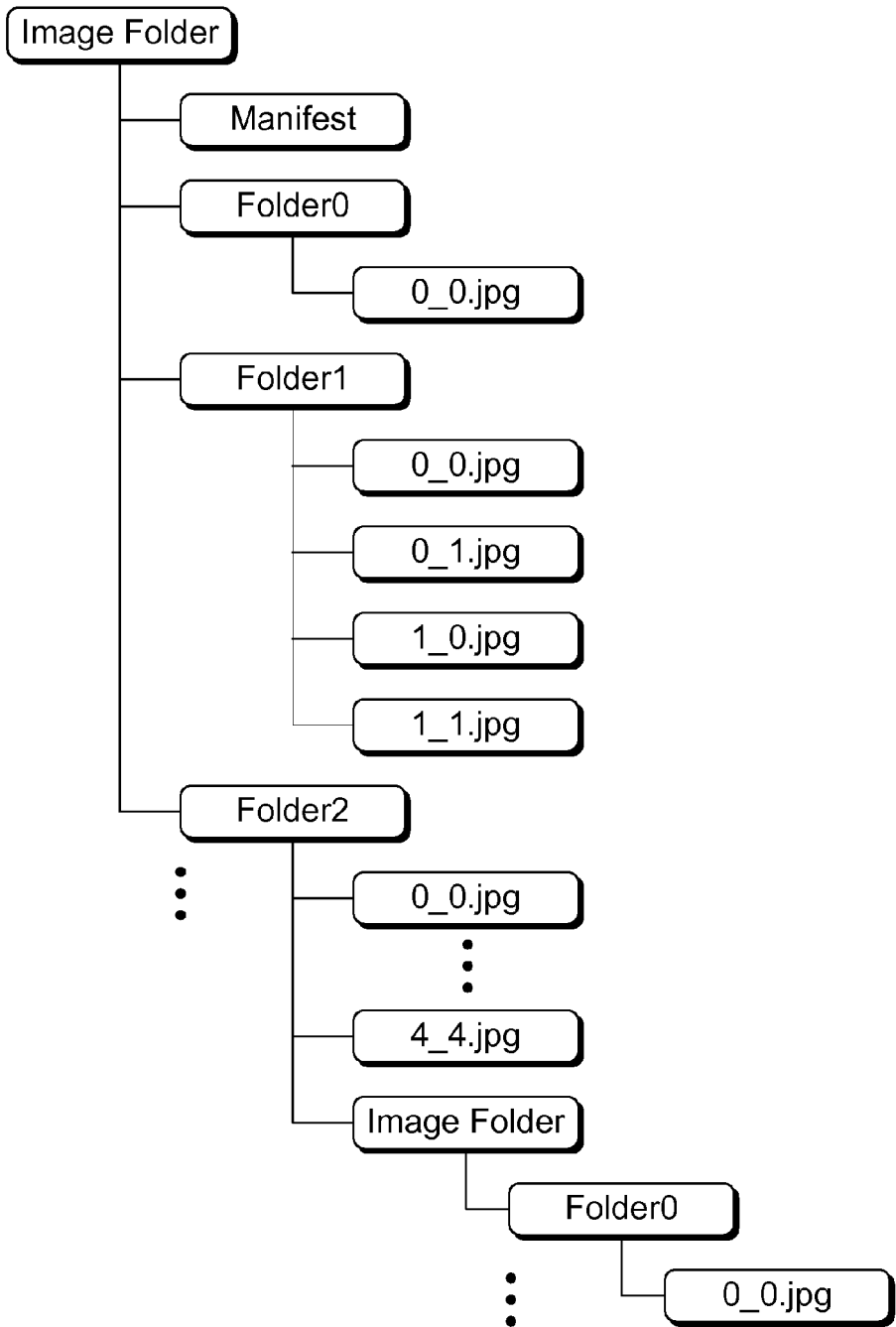
FIG. 8 illustrates an example of storing a variable resolution image in accordance with one or more embodiments.

FIG. 8 illustrates an example of storing a variable resolution image in accordance with one or more embodiments. In FIG. 8, a parent folder includes a manifest and three or more folders (folder0, folder1, folder2, etc.). Each of these folders stores a tile of image data for the corresponding level as a separate file following the "x_y" naming convention discussed above. These files also include an extension of ".jpg" to indicate they are stored in a JPEG format. For example, folder1 stores image data for four tiles: 0_0.jpg, 0_1.jpg, 1_0.jpg, and 1_1. jpg.

Additionally, folder2 includes an additional image folder for an image pyramid corresponding to one of the portions in folder2. This image folder includes one or more folders (folder 0, etc.), each storing a tile of image data for the corresponding level as a separate file following the "x_y" naming convention discussed above.

It should be noted that, when using this technique of storing image pyramids as separate folders and files, the device displaying the image is aware of how this technique is used, but the device storing the image need not be. For example, referring to FIG. 1, assume that an image pyramid is stored as variable resolution image 114(1) and is being displayed by computing device 102. Variable resolution image display module 116 is aware of the technique used to store the image data for the image, and requests the appropriate files from server 104(1) in order to obtain and display the appropriate data (e.g., as requested by a user of device 102). However, server 104(1) need have no knowledge of what these different files and folders store and/or represent. Rather, server 104(1) can simply return to device 102 the files requested by device 102. Accordingly, variable resolution images can be readily supported by various legacy systems and protocols, such as using HTTP (HyperText Transport Protocol).

In one or more other embodiments, the image data for the image pyramid, including the different tiles of the different levels, is stored in a single file. A manifest can identify offsets into the file where the image data for the various tiles are stored. The manifest can be stored as part of the single file, or alternatively separately from the single file. Given the offsets identified in the manifest, byte ranging can then be used to retrieve image data for the desired portions.

Additionally, multiple image pyramids can similarly be stored in a single file. The manifest can identify offsets into the file where the image data for the different image pyramids are stored. Given the offsets identified in the manifest, byte ranging can then be used to retrieve image data for desired portions of particular image pyramids.

Tables I and II describe an example file format that can be used for storing the image data for the image pyramid in a single file. Various information is included in this example file format. It is to be appreciated, however, that the information described in Tables I and II is only an example, and that alternatively additional information can be included the file format and/or some of the information in Tables I and II can be excluded from the file format.

Table I includes data describing the entire image pyramid, or alternatively describing multiple image pyramids. This data includes image data for the bottom level of a top pyramid for a variable resolution image (e.g., the data for level 308 of pyramid 302 of FIG. 3). Table II includes data describing a portion of the image pyramid for which higher resolution versions are available (e.g., to which another image pyramid corresponds). Accordingly, the file format can include multiple occurrences of the data in Table II, each describing a different portion of the image pyramid for which higher resolution versions are available.

TABLE I

| Item | Description |
| --- | --- |
| Tile Size | A size, such as width and height, of the tiles in the levels of the image pyramid. |
| Overlap | An amount of data (e.g., in pixels) to use from adjacent tiles when performing tile overlapping. |
| Width | A width of the bottom level of the image pyramid. Can be the bottom level of a single image pyramid (e.g., level 308 of image pyramid 302 of FIG. 3), or the bottom level as if the image had the resolution of another corresponding image pyramid (e.g., as if the image had the resolution of the bottom level of pyramid 304 of FIG. 3). |
| Height | A height of the bottom level of the image pyramid. Can be the bottom level of a single image pyramid (e.g., level 308 of image pyramid 302 of FIG. 3), or the bottom level as if the image had the resolution of another corresponding image pyramid (e.g., as if the image had the resolution of the bottom level of pyramid 304 of FIG. 3). |
| Image Data | The image data to be displayed for one or more portions of a bottom level of the pyramid, or an identifier of where the image data to be displayed is located. Image data for higher resolution versions of particular portions can be included in a description of a particular portion as in Table II below. |

TABLE II

| Item | Description |
| --- | --- |
| Portion Location | A portion of the image pyramid for which a higher resolution version is available, such as via a corresponding additional image pyramid. This portion can be a tile, or alternatively a portion of a tile. The location can be identified in different manners, such as using a Cartesian or rectangular coordinate system. |
| Portion Size | A size of the portion for which a higher resolution version is available, such as via a corresponding additional image pyramid. This portion can be a tile, or alternatively a portion of a tile. The size can be identified in different manners, such as a width and height beginning at the portion location. |
| Min Level | A highest level of the image pyramid at which the higher resolution version is available. This highest level oftentimes corresponds to a bottom level of another image pyramid. |
| Max Level | A lowest level of the image pyramid at which the higher resolution version is available. |
| Image Data | The image data to be displayed as a higher resolution version for a particular portion, or an identifier of where the image data to be displayed is located. |

By way of a specific example, Table III lists example code for a schema defining an image using the data of Tables I and II. It is to be appreciated, however, that the code of Table III is only an example, and that other schemas and/or formats can alternatively be used.

TABLE III

```
1  <?xml version="1.0" encoding="utf-8"?>
2  <Image TileSize="256" Overlap="1" Format="WDP"
     xmlns="location">
3    <Size Width="1600" Height="1200" />
4    <DisplayRects>
5      <DisplayRect MinLevel="8" MaxLevel="10">
6        <Rect X="100" Y="100" Width="100" Height="100" />
7      </DisplayRect>
8      <DisplayRect MinLevel="8" MaxLevel="10">
9        <Rect X="900" Y="900" Width="100" Height="100" />
10     </DisplayRect>
11   </DisplayRects>
12 </Image>
```

The example of Table III is shown using XML (eXtensible Markup Language), with a version and encoding used for the XML being identified in line 1. At line 2, a description of the tile size, overlap, image format (e.g., HD Photo as identified by "WDP"), and a location ("location") of where a definition of the schema being used can be found. At line 3, the width and height for the image resolution are set. At lines 4-11, two different portions of the image pyramid for which higher resolution versions are available are described. At lines 5-7, one portion is described that begins at an x,y (Cartesian) location of 100,100, having a width and height (portion size) of 100×100 pixels. A Min Level of the portion is set at 8, while the Max Level of the portion is set at 10. At lines 8-10, another portion is described that begins at an x,y (Cartesian) location of 900,900, having a width and height (portion size) of 100×100 pixels. A Min Level of the portion is set at 8, while the Max Level of the portion is set at 10. At line 12, the end of the image description is denoted.

In one or more embodiments, the image data for multiple levels of the one or more image pyramids can be included using such a file format as shown in Tables I, II, and III. Alternatively, the image data for only the bottom level of each pyramid can be included using such a file format, and the higher level portions generated on-the-fly when needed for display (e.g., using a variety of different scaling or image resizing algorithms or processes as discussed above).

The image data for the image pyramid can alternatively be stored in a variety of other manners. In one or more embodiments, the image data for the different tiles of the different levels of the image pyramid are stored as one or more files in a zip file or another container file. In one or more other embodiments, the image data for the different portions of the different levels of the image pyramid is stored as data using another protocol. For example, the portions of one level of the image pyramid (e.g., the top level, the bottom level, etc.) can be stored as a JPEG image, while the portions of the remaining levels are stored as Exif metadata for the JPEG image. Alternatively, the image data for the image pyramid can be stored using a variety of other proprietary and/or public conventions or techniques.

Figure 9:
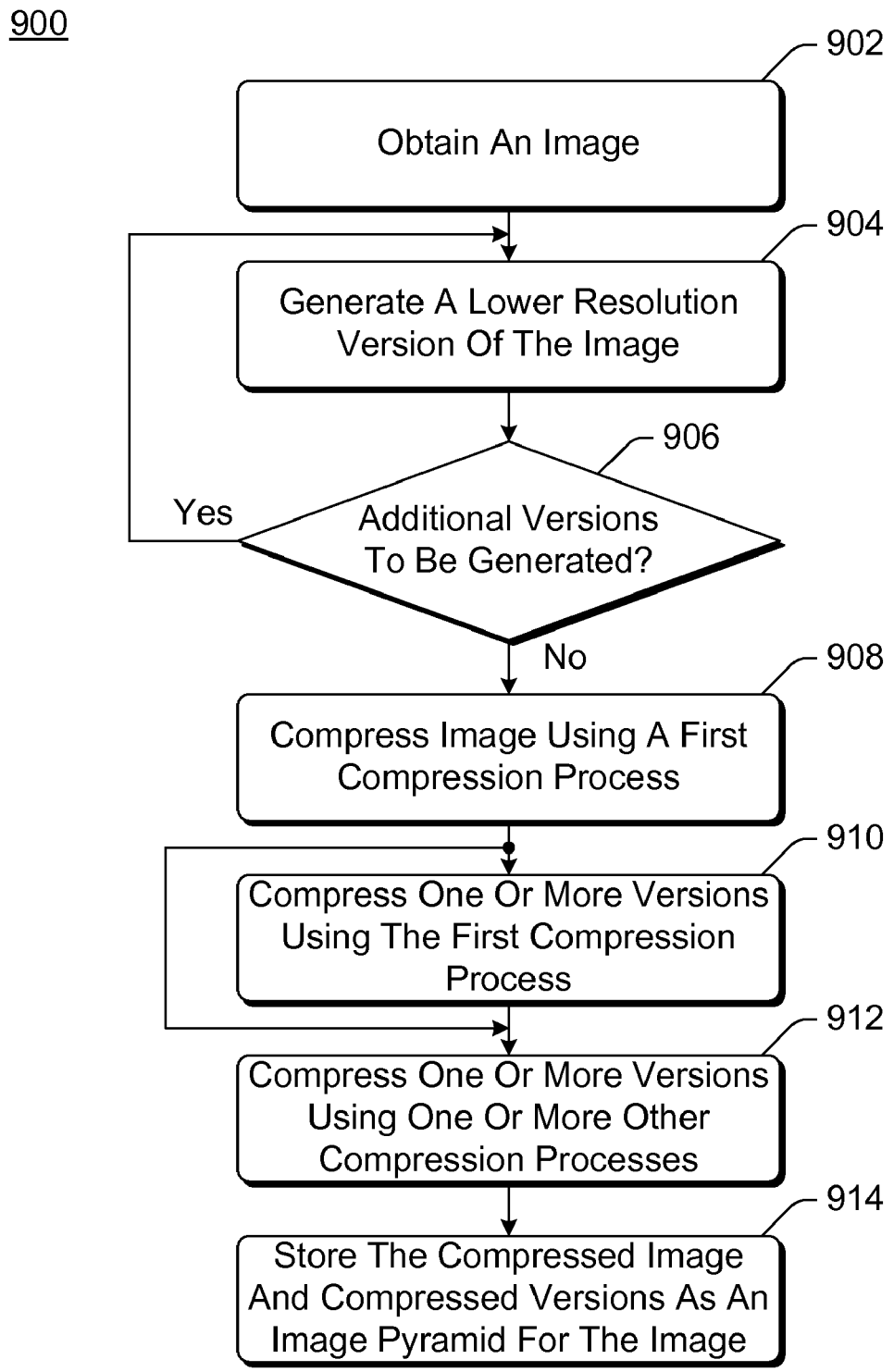
FIG. 9 is a flowchart illustrating an example process for generating and storing a multiple resolution image in accordance with one or more embodiments.

FIG. 9 is a flowchart illustrating an example process 900 for generating and storing a multiple resolution image in accordance with one or more embodiments. Process 900 is carried out by a device, such as device 102 or server 104 of FIG. 1, and can be implemented in software, firmware, hardware, or combinations thereof. Process 900 is an example process for generating and storing a multiple resolution image; additional discussions of generating and storing a multiple resolution image are included herein with reference to different figures.

In process 900, an image is obtained (act 902). Based on this image, a lower resolution version of the image is generated (act 904). This lower resolution version can be generated using a variety of different scaling processes as discussed above. Additionally, this lower resolution version will be stored as a level of an image pyramid for the image.

A check is then made as to whether additional versions of the image are to be generated (act 906). How many versions are generated can vary by implementation. For example, a user of the device implementing process 900 can identify how many versions are to be generated, process 900 can generate versions until a version of a particular resolution has been generated (e.g., a 1×1 pixel resolution, a 256×256 pixel resolution, etc.), and so forth.

The image obtained an act 902 is compressed using a first compression process (act 908). As discussed above, a variety of different compression processes can be used. Optionally, one or more versions of the image are also compressed using the first compression process (act 910).

Additionally, one or more versions of the image are compressed using one or more other compression processes (act 912). As discussed above, versions of the image that are at higher levels of the image pyramid (and thus have lower resolutions) are compressed using higher quality compression processes than versions of the image that are at lower levels of the image pyramid (including the image obtained in act 902). Accordingly, the first compression process in act 908 is a lower quality compression process than the one or more other compression processes in act 912. These different quality compression processes can be obtained in a variety of different manners as discussed above.

The compressed image as well as the compressed versions of the image are stored as an image pyramid for the image (act 914). The compressed image, as well as each of these compressed versions of the image, is a level of the image pyramid. The image pyramid can be stored in a variety of different manners as discussed above.

Figure 10:
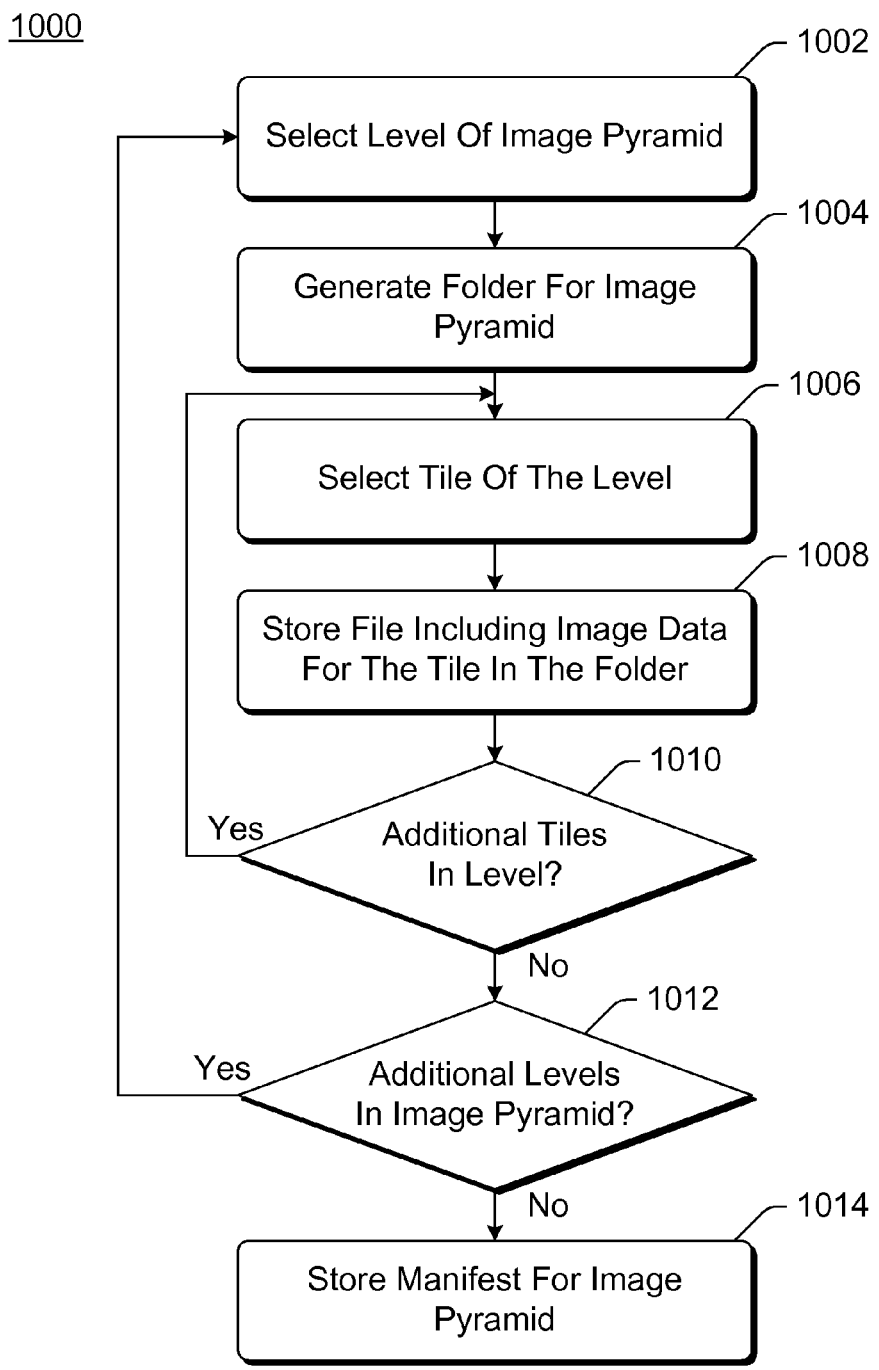
FIG. 10 is a flowchart illustrating an example process for storing a multiple resolution image in accordance with one or more embodiments.

FIG. 10 is a flowchart illustrating an example process 1000 for storing a multiple resolution image in accordance with one or more embodiments. Process 1000 is carried out by a device, such as device 102 or server 104 of FIG. 1, and can be implemented in software, firmware, hardware, or combinations thereof. Process 1000 is an example process for storing a multiple resolution image; additional discussions of storing a multiple resolution image are included herein with reference to different figures.

In process 1000, a level of an image pyramid is selected (act 1002), and a folder for the selected level is generated (act 1004). The level can be selected in a variety of different manners, such as the top level, the bottom level, random selection, selection in accordance with some other criteria or rules, and so forth.

A tile of the level is selected (act 1006), and the image data for the selected tile is stored in the folder (act 1008). The tile can be selected in a variety of different manners, such as from the top-left corner of the level, from the bottom-right corner of the level, random selection, selection in accordance with some other criteria or rules, and so forth.

A check is made as to whether there are additional tiles in the level that have not been selected (act 1010). If there are any such tiles, then process 1000 returns to act 1006 to select one of those tiles. However, if there are no such tiles, then a check is made as to whether there are additional levels in the image pyramid that have not been selected (act 1012). If there are any such levels, then process 1000 returns to act 1002 to select one of those levels.

If there are no levels that have not been selected yet, then a manifest for the image pyramid is stored (act 1014). As discussed above, this manifest includes one or more identifiers of one or more other image pyramids that correspond to a portion of the image pyramid.

Figure 11:
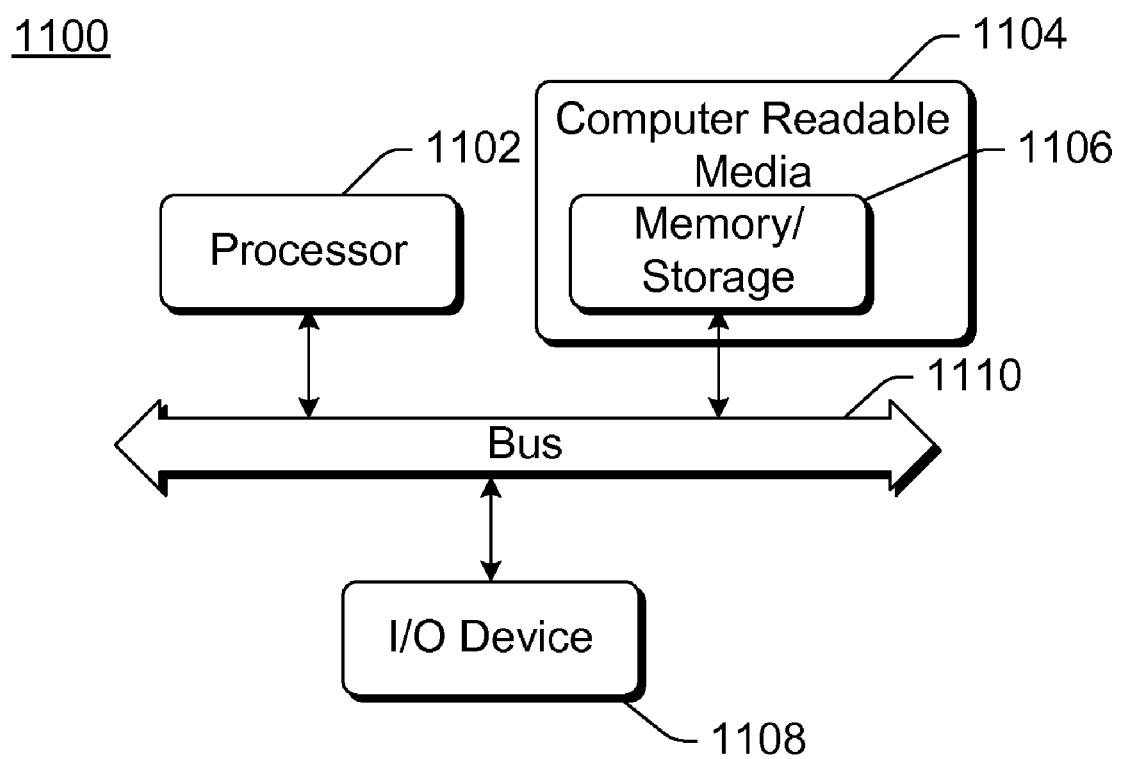
FIG. 11 illustrates an example computing device that can be configured to implement the variable resolution images in accordance with one or more embodiments.

FIG. 11 illustrates an example computing device 1100 that can be configured to implement the variable resolution images in accordance with one or more embodiments. Computing device 1100 can be, for example, computing device 102 of FIG. 1, or a server 104 of FIG. 1.

Computing device 1100 includes one or more processors or processing units 1102, one or more computer readable media 1104 which can include one or more memory and/or storage components 1106, one or more input/output (I/O) devices 1108, and a bus 1110 that allows the various components and devices to communicate with one another. Computer readable media 1104 and/or one or more I/O devices 1108 can be included as part of, or alternatively may be coupled to, computing device 1100. Bus 1110 represents one or more of several types of bus structures, including a memory bus or memory controller, a peripheral bus, an accelerated graphics port, a processor or local bus, and so forth using a variety of different bus architectures. Bus 1110 can include wired and/or or wireless buses.

Memory/storage component 1106 represents one or more computer storage media. Component 1106 can include volatile media (such as random access memory (RAM)) and/or nonvolatile media (such as read only memory (ROM), Flash memory, optical disks, magnetic disks, and so forth). Component 1106 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1102. It is to be appreciated that different instructions can be stored in different components of computing device 1100, such as in a processing unit 1102, in various cache memories of a processing unit 1102, in other cache memories of device 1100 (not shown), on other computer readable media, and so forth. Additionally, it is to be appreciated that the location where instructions are stored in computing device 1100 can change over time.

One or more input/output devices 1108 allow a user to enter commands and information to computing device 1100, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," and "component" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 11. The features of the variable resolution images techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   displaying a variable resolution image at an initial resolution, the variable resolution image having multiple portions, at least two portions of the multiple portions being displayed simultaneously at different resolutions and having different selectable resolutions than each other, wherein the variable resolution image defines an outer periphery and wherein the at least two portions being displayed simultaneously at different resolutions compose part of the variable resolution image within the outer periphery;
   receiving a request to display one of the multiple portions of the variable resolution image at a higher resolution;
   checking whether a higher resolution version of the one portion is available; and
   displaying the higher resolution version of the one portion if available, otherwise displaying the one portion at the initial resolution.

2. A method as recited in claim 1, further comprising:
   receiving a request to display a first portion of the higher resolution version at a higher resolution;
   checking whether a higher resolution version of the first portion is available; and
   displaying the higher resolution version of the first portion if available.

3. A method as recited in claim 1, wherein the variable resolution image is stored as multiple image pyramids, the at least two portions are included in a level of one of the multiple image pyramids, and the checking whether a higher resolution version of the one portion is available comprises checking whether one of the multiple image pyramids corresponds to the one portion.

4. A method as recited in claim 1, wherein the initial resolution is a resolution of the variable resolution image that is closest to a display resolution being used by a device displaying the image.

5. A method as recited in claim 1, wherein the variable resolution image is stored as multiple image pyramids, the at least two portions are included in a level of one of the multiple image pyramids, and one of the at least two portions corresponds to another of the multiple image pyramids, but a second portion of the at least two portions does not correspond to another of the multiple image pyramids.

6. A method as recited in claim 1, wherein the variable resolution image is stored as multiple image pyramids, one or more portions of the multiple portions are included in a level of one of the multiple image pyramids, and each of the one or more portions corresponds to one other image pyramids of the multiple image pyramids.

7. A method as recited in claim 6, wherein the level comprises a bottom level of the one of the multiple image pyramids.

8. A method as recited in claim 6, wherein each of the other image pyramids includes a bottom level having a portion that corresponds to an additional image pyramid.

9. One or more computer storage media having stored thereon multiple instructions that, when executed by one or more processors, cause the one or more processors to:
   obtain, from a source, at least a portion of a variable resolution image that includes multiple image pyramids each having multiple levels, wherein at least one level contains portions compressed utilizing different compression processes and configured to compose the variable resolution image at different initial resolutions with different resolutions, a first image pyramid of the multiple image pyramids corresponding to a first portion of a level of a second image pyramid of the multiple image pyramids; and display a level of one of the multiple image pyramids of the variable resolution image, wherein at least two portions of the level are displayed at different resolutions, wherein the variable resolution image defines an outer periphery and wherein the at least two portions being displayed at different resolutions compose part of the variable resolution image within the outer periphery.

10. One or more computer storage media as recited in claim 9, wherein the source comprises a remote server accessed via a network.

11. One or more computer storage media as recited in claim 9, wherein the one or more processors are part of a digital camera, and the source is a local storage device of the digital camera.

12. One or more computer storage media as recited in claim 9, wherein the level of the second image pyramid comprises a bottom level of the second image pyramid.

13. One or more computer storage media as recited in claim 9, wherein one or more portions of the second image pyramid have corresponding image pyramids in the multiple image pyramids, and one or more other portions of the second image pyramid have no corresponding image pyramids in the multiple image pyramids.

14. One or more computer storage media as recited in claim 9, wherein the instructions further cause the one or more processors to:

receive a request to display the first portion at a higher resolution;

obtain at least a portion of a level of the first image pyramid; and display the at least a portion of the level of the first image pyramid.

15. One or more computer storage media as recited in claim 9, wherein a third image pyramid of the multiple image pyramids corresponds to a second portion of the level of the second image pyramid, the second portion being a different portion than the first portion.

16. One or more computer storage media as recited in claim 9, wherein a third image pyramid of the multiple image pyramids corresponds to a portion of a level of the first image pyramid.

17. One or more computer storage media as recited in claim 9, wherein the instructions further cause the one or more processors to:

receive a request to display a second portion of the level at a higher resolution;

check whether a higher resolution version of the second portion is available; and display the higher resolution version of the second portion if available.

18. One or more computer storage media as recited in claim 17, wherein the instructions further cause the one or more processors to determine that the higher resolution version of the second portion is available if the second portion is a same portion as the first portion.

19. One or more computer storage media having stored thereon multiple instructions that, when executed by one or more processors, cause the one or more processors to:

obtain a first image pyramid for an image, the first image pyramid including multiple levels having different resolutions wherein at least one level contains at least two portions configured to display at different resolutions to compose part of the image and at least two portions with different resolutions, the at least one level configured to be obtained from a folder that corresponds to the at least one level that contains at least two portions compressed utilizing different compression processes and configured to initially display at different resolutions to compose part of the image, a bottom level of the multiple levels of the first image pyramid having multiple tiles;

obtain a second image pyramid for the image, the second image pyramid including multiple levels having different resolutions, a bottom level of the multiple levels of the second image pyramid having multiple tiles, a top level of the second image pyramid corresponding to a first tile of the multiple tiles of the bottom level of the first image pyramid;

obtain a third image pyramid for the image, the third image pyramid including multiple levels having different resolutions, a top level of the third image pyramid corresponding to a tile of the multiple tiles of the bottom level of the second image pyramid; and store the first image pyramid, the second image pyramid, and the third image pyramid as a variable resolution image for the image.

20. One or more computer storage media as recited in claim 19, the instructions further causing the one or more processors to:

obtain a fourth image pyramid for the image, the fourth image pyramid including multiple levels having different resolutions, a top level of the fourth image pyramid corresponding to a second tile of the multiple tiles of the bottom level of the first image pyramid, the second tile being a different tile than the first tile; and store the fourth image pyramid as part of the variable resolution image for the image.

* * * * *